(12) United States Patent
Tang et al.

(10) Patent No.: US 12,617,561 B2
(45) Date of Patent: May 5, 2026

(54) ROBOTIC MULTICOPTER SAMPLER FOR INFIELD CROP AND SOIL HEALTH SENSING AND TISSUE SAMPLE COLLECTION

(71) Applicant: Iowa State University Research Foundation, Inc., Ames, IA (US)

(72) Inventors: Lie Tang, Ames, IA (US); Liang Dong, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 19/194,863

(22) Filed: Apr. 30, 2025

(65) Prior Publication Data

US 2025/0376279 A1     Dec. 11, 2025

Related U.S. Application Data

(60) Provisional application No. 63/658,138, filed on Jun. 10, 2024.

(51) Int. Cl.
*B64U 20/87* (2023.01)
*B64U 10/14* (2023.01)
(Continued)

(52) U.S. Cl.
CPC ............. *B64U 20/87* (2023.01); *B64U 10/14* (2023.01); *B64U 60/20* (2023.01); *B64U 60/50* (2023.01);
(Continued)

(58) Field of Classification Search
CPC ........ B64U 20/87; B64U 60/20; B64U 60/50; B64U 2101/40; B64U 2101/30
See application file for complete search history.

(56) References Cited

U.S. PATENT DOCUMENTS 9,592,908 B2 * 3/2017 Gentry .................. B64U 50/14
11,059,582 B2 * 7/2021 Nahuel-Andrejuk .......................
B64U 10/14
(Continued)

FOREIGN PATENT DOCUMENTS

| CN | 115042964 A | * | 9/2022 | ............. B64C 27/08 |
| CN | 115056982 A | * | 9/2022 | ............. G01S 13/86 |
| KR | 101845395 B1 | | 4/2018 | |

OTHER PUBLICATIONS

Chen, Ziling et al., PhenoBee: Drone-Based Robot for Automatic In-Field Proximal Phenotyping; YouTube Video accessed at https://www.youtube.com/watch?v=Vllbcg2qS90&t=71s on Jun. 19, 2025.

*Primary Examiner* — Philip J Bonzell
(74) *Attorney, Agent, or Firm* — McKee, Voorhees & Sease, PLC

(57) ABSTRACT

An unmanned aerial vehicle (UAV), such as a multicopter, can be equipped with unique tools for use in agricultural operations. For example, the tools can be acquisition tools that can acquire a physical sample from a growing plant, such as a crop. The tools could also acquire physical specimens from areas around the plants. In addition, the UAV could be equipped with sensors, such as imagery acquiring devices (e.g., cameras, LIDAR, time of flight sensors, etc.) to acquire even additional information. The tools can be equipped via movable arms and/or end effectors to be able to directly contact the plants and/or soil. The longevity of the flight time of the UAV can be improved by tethering, improved batteries, or other add-ons to be able to acquire more information.

20 Claims, 14 Drawing Sheets

(51) Int. Cl.

| | | |
|---|---|---|
| *B64U 60/20* | (2023.01) | |
| *B64U 60/50* | (2023.01) | |
| *G01N 1/08* | (2006.01) | |
| *B64U 101/30* | (2023.01) | |
| *B64U 101/40* | (2023.01) | |

(52) U.S. Cl.
CPC ........... *G01N 1/08* (2013.01); *B64U 2101/30* (2023.01); *B64U 2101/40* (2023.01)

(56) References Cited

U.S. PATENT DOCUMENTS

| | | | | |
|---|---|---|---|---|
| 11,713,117 B2 * | 8/2023 | Stanhope | ................ | B64C 25/68 |
| | | | | 701/16 |
| 11,719,681 B2 * | 8/2023 | Chantz | ................ | G01N 27/041 |
| | | | | 702/7 |
| 11,719,682 B2 * | 8/2023 | Chantz | ................ | A01B 79/005 |
| | | | | 702/7 |
| 2020/0255139 A1 * | 8/2020 | Nahuel-Andrejuk | ........................ | |
| | | | | G01D 21/02 |
| 2020/0255140 A1 * | 8/2020 | Nahuel-Andrejuk | ........................ | |
| | | | | G05D 1/0094 |
| 2020/0257318 A1 * | 8/2020 | Nahuel-Andrejuk | ........................ | |
| | | | | G05D 1/0094 |
| 2020/0377211 A1 * | 12/2020 | Daddi | ....................... | A01G 7/06 |
| 2021/0300547 A1 * | 9/2021 | Stanhope | ................... | B64F 1/16 |
| 2022/0090992 A1 * | 3/2022 | Mortensen | .............. | G01N 1/18 |
| 2022/0137023 A1 * | 5/2022 | Chantz | ................ | G01N 27/041 |
| | | | | 702/7 |
| 2022/0137024 A1 * | 5/2022 | Chantz | ................... | G01N 33/24 |
| | | | | 702/7 |

* cited by examiner

80

84 82 85 85 86 87 88 89

38

39

100

101

102

38

ROBOTIC MULTICOPTER SAMPLER FOR INFIELD CROP AND SOIL HEALTH SENSING AND TISSUE SAMPLE COLLECTION

CROSS REFERENCE TO RELATED APPLICATIONS

This application claims priority under 35 U.S.C. § 119(e) to provisional patent application U.S. Ser. No. 63/658,138, filed Jun. 10, 2024. The provisional patent application is hereby incorporated by reference in its entirety herein, including without limitation: the specification, claims, and abstract, as well as any figures, tables, appendices, or drawings thereof.

TECHNICAL FIELD

The present disclosure relates generally to unmanned aerial vehicles (UAVs). More particularly, but not exclusively, the disclosure relates to UAVs that are equipped with tools and/or sensors for use in the agricultural industry, such as by taking physical specimen collections and inspection, which can be used for plant health and soil nutritional status.

BACKGROUND

The background description provided herein gives context for the present disclosure. Work of the presently named inventors, as well as aspects of the description that may not otherwise qualify as prior art at the time of filing, are neither expressly nor impliedly admitted as prior art.

In the U.S., over 349 million acres are planted for crops. In agriculture-intensive states, such as Iowa, around 90% of the land is used for farming. Thus, a robotic system with the purpose of assisting farmers to improve the efficiency and productivity of their production systems through conducting precision farming practices would be of a great value and interest to farmers. Precision farming relies on georeferenced crop performance information such as crop's nutritional status and stress factors like pests and diseases, and to that end, crop scouting with field crews has been an essential tool.

In addition, plant tissue samples can be used to identify specific pathogens (or strains thereof) of pests and monitor their spread. This is particularly useful during outbreaks of crop diseases, as tissue samples can be screened by using high-throughput DNA sequencing technologies to genotype the associated pathogens. Given the high sensitivity of DNA sequencing, the presence of pathogens can often be identified prior to the onset of visible disease symptoms.

However, manual scouting and tissue sample collection over large crop production fields are laborious and time-consuming. To address this, unmanned ground vehicles (UGVs) and unmanned aerial vehicles (UAVs) have been used with agricultural operations. Such vehicles, including those found in FIGS. 1 and 2, have been developed for high-throughput field-based phenotyping with customized stereo cameras and bio-sensor deployment using its onboard robotic manipulator. Although such type of ground-based robot can be used to scout an entire production field, it would be a rather inefficient and impractical solution because most crops are planted in long rows, requiring a ground-based and row-following vehicle to transverse many long rows to sample plants that are scattered throughout a field.

UAVs offer better efficiency in traversing across large crop fields to reach scattered sampling locations. Multicopters, e.g., quadcopters or hexacopters, as opposed to fixed-wing aerial vehicles, have been widely used in many applications, such as environment monitoring, communication, delivery service, etc., primarily due to their greater maneuverability, hovering capability, and low cost.

However, existing multicopter platforms for large-scale crop sampling are subject to limited flight duration and poor stability under wind disturbances. Although new technologies for autonomous battery swapping have been developed to resume UAV flights, it cannot break the maximum duration barrier and limits the mobility of UAVs due to frequent recalls of battery swapping. For large-scale crop plant sampling over hundreds of acres (e.g., the average corn farm size at Iowa is 333 acres) with many monitoring sites, existing multicopter platforms often cannot meet the minimum duration requirement, not to mention carrying those power-demanding payload such as motors, powerful CPUs and GPUs, cameras, LiDAR, and sampling instruments. Attempts to extend a UAV's operational time have, in large part, focused on the selection of efficient components and the use of power-efficient path planning and control strategies, which can still be insufficient to meet the power requirement.

Therefore, there exists a need for improved UAVs, such as a multicopter, that can be used to acquire samples and other information for large-scale crop fields, which include improved longevity (time of use) and also improved tools for collecting the samples.

SUMMARY

The following objects, features, advantages, aspects, and/or embodiments are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of any of the aspects of any of the embodiments of the present disclosure to improve on or overcome the deficiencies in the art.

It is a further object, feature, and/or advantage of any of the aspects of any of the embodiments of the present disclosure to provide an unmanned multicopter aerial vehicle that is equipped with a multi-joint robotic manipulator and which can serve as a muti-functional mobile robotic platform to employ sensors for instantaneous crop health and soil nutritional status inspection and sample collection via innovative end effector design and robotic motion controls. In addition, there can be multiple robotic manipulators on the vehicle. For example, multiple robotic manipulators may be needed and/or used when samples (e.g., plant leaves) are needed to be held in place to allow the engagement of instruments (e.g., sensors or actuators).

It is still yet a further object, feature, and/or advantage of any of the aspects of any of the embodiments of the present disclosure to provide improved landing ability for a UAV for use in varying elevations of terrain.

It is still another object, feature, and/or advantage of any of the aspects of any of the embodiments of the present disclosure to improve on the longevity of flight time of a UAV for use in the agricultural industry.

The apparatus and/or systems disclosed herein can be used in a wide variety of applications. For example, while at least some aspects and/or embodiments will be used for the agricultural industry, it is envisioned that additional industries (e.g., mining, construction, ecological, etc.) could benefit from that disclosed herein.

It is preferred that the apparatus be safe, cost effective, and durable.

According to some aspects of the present disclosure, an unmanned aerial vehicle comprises a platform comprising a processor; a plurality of rotor units operatively connected to the platform; a movable control arm extending from the platform, the movable control arm comprising at least a physical specimen acquisition tool and a non-physical sensor; and a landing system.

According to at least some aspects of some embodiments, the at least one physical specimen acquisition tool comprises a sensor probe for plant chemical composition sensing.

According to at least some aspects of some embodiments, the at least one physical specimen acquisition tool comprises an end effector for collecting a portion of a plant.

According to at least some aspects of some embodiments, the at least one physical specimen acquisition tool comprises a ground penetrating probe for sensing or collecting a portion of ground.

According to at least some aspects of some embodiments, the non-physical sensor comprises one or more stereo cameras, one or more time of flight sensors, one or more 3D imagery sensors, or some combination thereof.

According to at least some aspects of some embodiments, the movable control arm comprises one or more articulated robot arms.

According to at least some aspects of some embodiments, the movable control arm comprises a delta robot.

According to at least some aspects of some embodiments, the landing system comprises a plurality of telescoping legs to balance landing on uneven ground.

According to at least some aspects of some embodiments, the vehicle further comprises a GPS antenna.

According to at least some aspects of some embodiments, the vehicle further comprises a sensor cleaning solution container operatively connected to the platform to provide cleaning solution.

According to at least some aspects of some embodiments, the platform further comprises an inertial measurement unit.

According to additional aspects of the disclosure, a method for collecting both physical specimens and imagery information from plants and/or ground using a multicopter unmanned aerial vehicle comprises landing the multicopter unmanned aerial vehicle at or near the plants and ground using a landing system; physically contacting the ground or plants with an acquisition tool connected to the multicopter unmanned aerial vehicle via one or more movable control arms to collect a physical sample; collecting imagery information of the plants or ground with a sensor of the movable control arm(s); and georeferencing the physical sample and the imagery information with GPS.

According to at least some aspects of some embodiments, the method further comprises cleaning, conditioning, and/or reconditioning the sensor after collecting the imagery information.

According to at least some aspects of some embodiments, the method further comprises generating a prescription map for the application of particulate material based upon the collected physical and imagery information.

According to at least some aspects of some embodiments, the step of physically contacting the ground or plants with an acquisition tool comprises touching, penetrating, or removing a portion of the ground or plants.

According to at least some aspects of some embodiments, wherein the step of landing the multicopter unmanned aerial vehicle comprises extending telescoping legs to self-level the multicopter unmanned aerial vehicle based on the elevation of the ground.

According to additional aspects of the disclosure, a system for collecting both physical specimens and imagery information from plants and/or ground to generate a prescription agricultural map comprises an unmanned aerial vehicle, comprising: a platform comprising a processor; a plurality of rotor units operatively connected to the platform; one or more movable control arms extending from the platform, the one or more movable control arms comprising at least a physical specimen acquisition tool and a non-physical sensor; and a landing system; and computer readable medium including software to: control the data acquisition and the motion of the actuator(s); analyze data acquired from the at least a physical specimen acquisition tool and a non-physical sensor; and generate a prescription map for the application of particulate material based upon the analyzed data.

According to at least some aspects of some embodiments, at least one physical specimen acquisition tool comprises a ground penetrating probe for sensing or collecting a portion of ground.

According to at least some aspects of some embodiments, the system further comprises a GPS antenna to georeferenced the data acquired from the at least a physical specimen acquisition tool and a non-physical sensor.

According to at least some aspects of some embodiments, the landing system comprises a plurality of telescoping legs to balance landing on uneven ground.

These and/or other objects, features, advantages, aspects, and/or embodiments will become apparent to those skilled in the art after reviewing the following brief and detailed descriptions of the drawings. The present disclosure encompasses (a) combinations of disclosed aspects and/or embodiments and/or (b) reasonable modifications not shown or described.

BRIEF DESCRIPTION OF THE DRAWINGS

Several embodiments in which the present disclosure can be practiced are illustrated and described in detail, wherein like reference characters represent like components throughout the several views. The drawings are presented for exemplary purposes and may not be to scale unless otherwise indicated.

Figure 1:
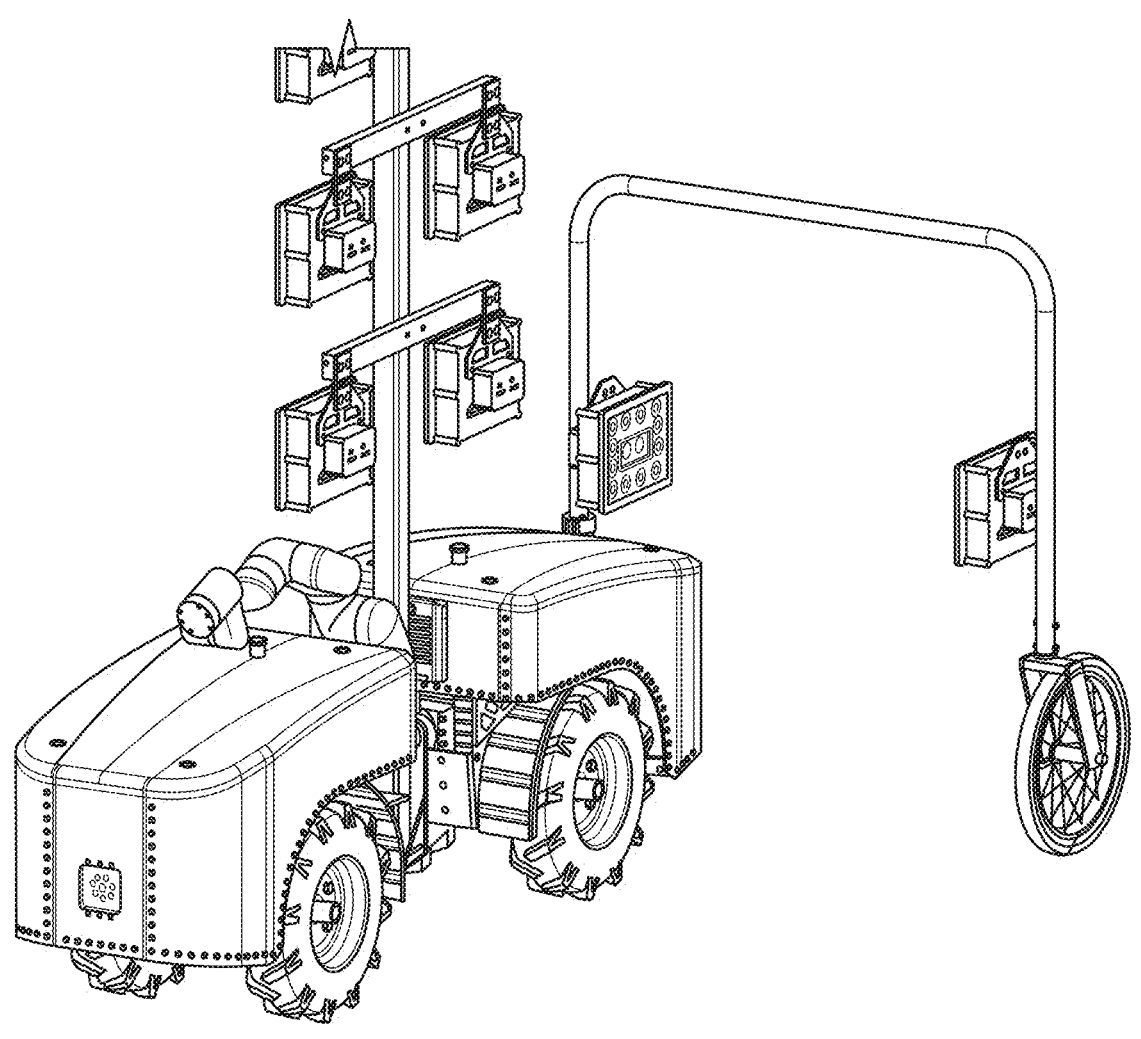
FIG. 1 is a perspective of a prior art unmanned ground vehicle (UGV).

An artisan of ordinary skill in the art need not view, within isolated figure(s), the near infinite distinct combinations of features described in the following detailed description to facilitate an understanding of the present disclosure.

DETAILED DESCRIPTION

The present disclosure is not to be limited to that described herein. Mechanical, electrical, chemical, procedural, and/or other changes can be made without departing from the spirit and scope of the present disclosure. No features shown or described are essential to permit basic operation of the present disclosure unless otherwise indicated.

Unless defined otherwise, all technical and scientific terms used above have the same meaning as commonly understood by one of ordinary skill in the art to which embodiments of the present disclosure pertain.

The terms "a," "an," and "the" include both singular and plural referents.

The term "or" is synonymous with "and/or" and means any one member or combination of members of a particular list.

As used herein, the term "exemplary" refers to an example, an instance, or an illustration, and does not indicate a most preferred embodiment unless otherwise stated.

The term "about" as used herein refers to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variables, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

A robotic platform that is capable of crop health and soil nutritional status inspection and plant specimen retrieval over multiple crop species with a greater mobility and throughput to cover large scale production fields will be transformative to precision agriculture. It can also provide scientists with high-quality data samples and enable growers to sample their crops more frequently and intelligently and thereby making better and timely crop management decisions.

Therefore, as will be understood from the following, an unmanned multicopter aerial vehicle (UAV) that is equipped with one or more multi-joint robotic manipulators can serve as a muti-functional mobile robotic platform to employ sensors for instantaneous crop health and soil nutritional status inspection and sample collection via innovative end effector design and robotic motion controls. Insertable and clampable sensors can be employed for crop plant status (water, nutrition, disease, pathogen, bacteria, hormone, etc.) inspection and specially developed sensor probes can be used for soil health conditions (moisture, salinity, nutrition, microbe, gas emission, carbon, organic matters, etc.), both in real-time and at a field scale. Furthermore, the same multicopter platform can be utilized to collect tissue samples of plants through innovative sample collection and storage mechanism design. Every sensor measurement and tissue sample will be georeferenced by using the onboard global position system (GPS) signals, resulting prescription maps that can be used for precision variable rate fertilizer and pesticide application, which will advance digital and precision agriculture practices.

Figure 2:
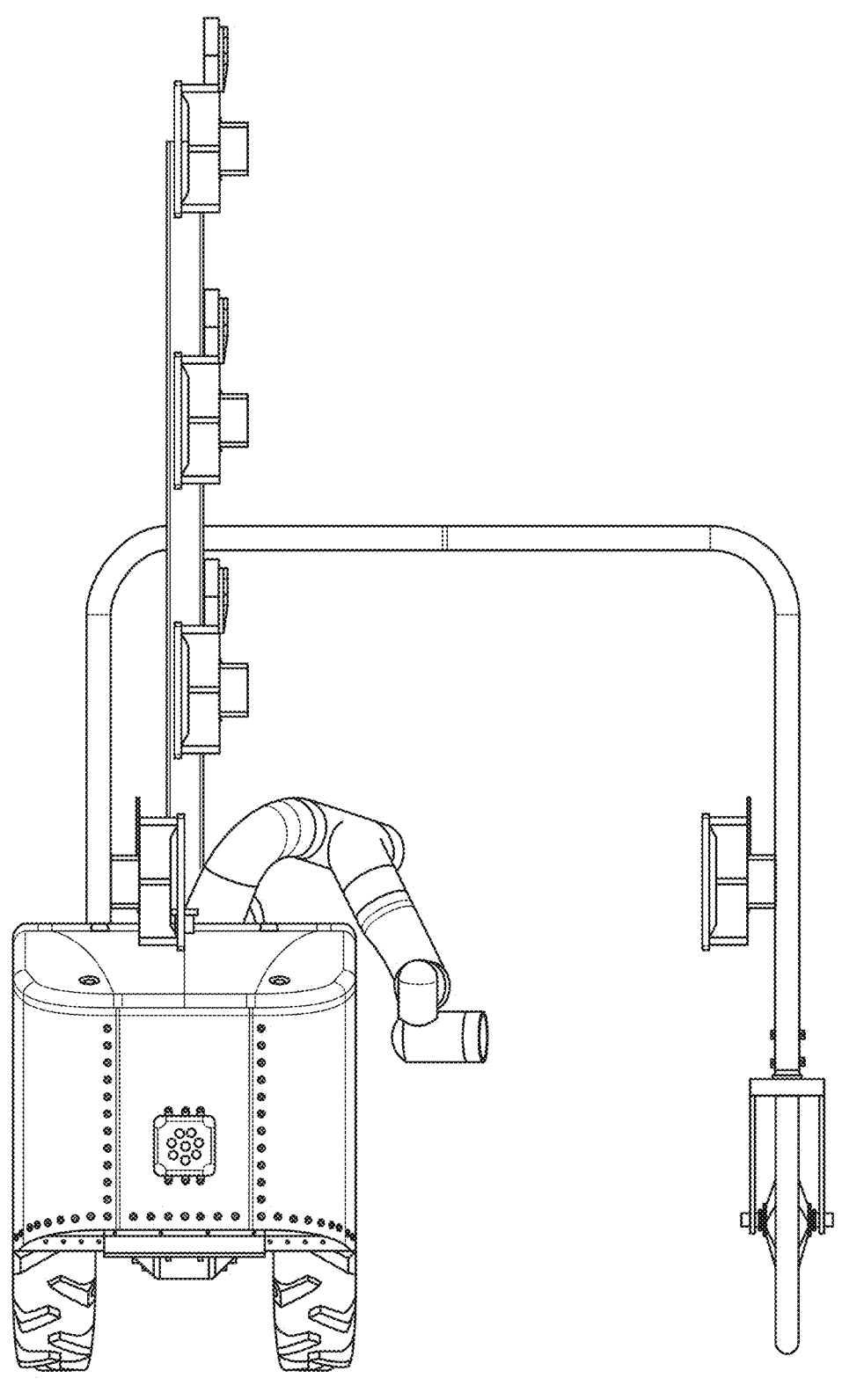
FIG. 2 is a front view of the UGV of FIG. 1.

As noted, FIGS. 1 and 2 show prior art examples of unmanned ground vehicles (UGVs), which can be used to acquire agricultural data. However, they have limitations as to access, longevity, etc., and therefore, a flying or aerial apparatus and system provides advantages and/or improvements.

Figure 3:
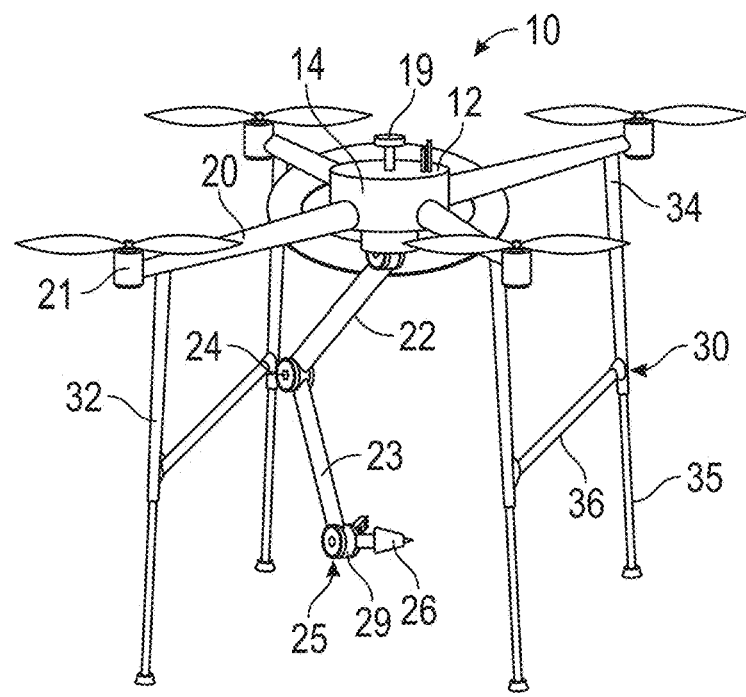
FIG. 3 is a view of an unmanned aerial vehicle (UAV) with articulated robot arm with sensor probe according to aspects of the present disclosure.

As such, FIG. 3 shows a UAV 10 according to at least some embodiments and including various aspects of the disclosure. The UAV 10 is a multicopter, which includes a platform 12 with a plurality of rotor units 21 connected via rotor arms 20. A multirotor or multicopter is a rotorcraft with more than two lift-generating rotors. An advantage of multirotor aircraft is the simpler rotor mechanics required for flight control. Unlike single- and double-rotor helicopters which use complex variable pitch rotors whose pitch varies as the blade rotates for flight stability and control, multirotors often use fixed-pitch blades; control of vehicle motion is achieved by varying the relative speed of each rotor to change the thrust and torque produced by each. According to various aspects of the disclosure, the UAV 10 could have four, six, or eight rotary propeller units 21. However, the number of rotors should not be limiting, and any type of multicopter is covered by the various aspects and/or embodiments of the disclosure.

Figure 12:
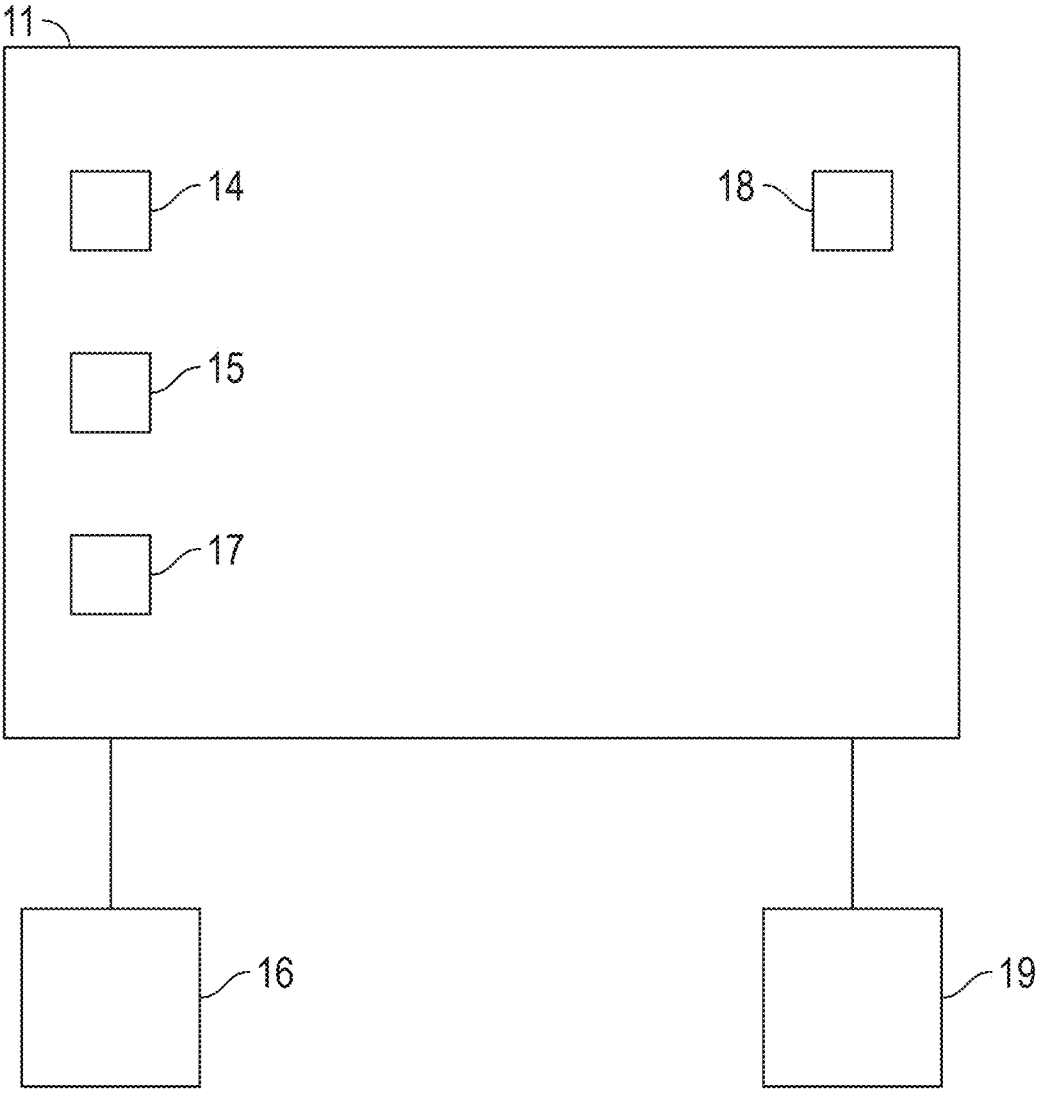
FIG. 12 is a schematic of a computing system used with a UAV as disclosed herein to generate an output, such as a prescription map for applying a particulate material to a field based upon collected and analyzed data from the UAV.

The platform 12 is a base and includes many of the operational, controls, and other electronic members (see, e.g., FIG. 12). For example, the platform 12 could include a computer or other processor 14, memory, 15, a power supply 16 (e.g., battery), database 17, and communications modules 18. In addition, an inertial measurement unit (IMU) can be used as part of the platform. These should not be limiting on the disclosure, however, and other components may be included or omitted.

In addition, a GPS antenna 19 is provided to provide georeferencing and location data for the UAV 10. This includes information for moving the UAV 10 and also to establish location of acquired data by the UAV 10. The GPS receiver 19 can be used flight control and registration of sample locations. The controls and GPS also can include a flight controller, an embedded computer for image processing and motion control of the robot manipulator, an IMU sensor for flight landing posture control. As will be understood, the controls can be used as part of a software package or module that can be used to generate prescription maps for variable-rate-based precision fertilizer and pesticide applications.

In communications and computing, a computer readable medium is a medium capable of storing data in a format readable by a mechanical device. The term "non-transitory" is used herein to refer to computer readable media ("CRM") that store data for short periods or in the presence of power such as a memory device.

One or more embodiments described herein can be implemented using programmatic modules, engines, or components. A programmatic module, engine, or component can include a program, a sub-routine, a portion of a program, or a software component or a hardware component capable of performing one or more stated tasks or functions. A module or component can exist on a hardware component independently of other modules or components. Alternatively, a module or component can be a shared element or process of other modules, programs, or machines.

The UAV 10 will preferably include an intelligent control (i.e., a controller) and components for establishing communications. Examples of such a controller may be processing units alone or other subcomponents of computing devices. The controller can also include other components and can be implemented partially or entirely on a semiconductor (e.g., a field-programmable gate array ("FPGA")) chip, such as a chip developed through a register transfer level ("RTL") design process.

A processing unit, also called a processor, is an electronic circuit which performs operations on some external data source, usually memory or some other data stream. Non-limiting examples of processors include a microprocessor, a microcontroller, an arithmetic logic unit ("ALU"), and most notably, a central processing unit ("CPU"). A CPU, also called a central processor or main processor, is the electronic circuitry within a computer that carries out the instructions of a computer program by performing the basic arithmetic, logic, controlling, and input/output ("I/O") operations specified by the instructions. Processing units are common in tablets, telephones, handheld devices, laptops, user displays, smart devices (TV, speaker, watch, etc.), and other computing devices.

The memory includes, in some embodiments, a program storage area and/or data storage area. The memory can comprise read-only memory ("ROM", an example of non-volatile memory, meaning it does not lose data when it is not connected to a power source) or random access memory ("RAM", an example of volatile memory, meaning it will lose its data when not connected to a power source). Examples of volatile memory include static RAM ("SRAM"), dynamic RAM ("DRAM"), synchronous DRAM ("SDRAM"), etc. Examples of non-volatile memory include electrically erasable programmable read only memory ("EEPROM"), flash memory, hard disks, SD cards, etc. In some embodiments, the processing unit, such as a processor, a microprocessor, or a microcontroller, is connected to the memory and executes software instructions that are capable of being stored in a RAM of the memory (e.g., during execution), a ROM of the memory (e.g., on a generally permanent basis), or another non-transitory computer readable medium such as another memory or a disc.

Generally, the non-transitory computer readable medium operates under control of an operating system stored in the memory. The non-transitory computer readable medium implements a compiler which allows a software application written in a programming language such as COBOL, C++, FORTRAN, or any other known programming language to be translated into code readable by the central processing unit. After completion, the central processing unit accesses and manipulates data stored in the memory of the non-transitory computer readable medium using the relationships and logic dictated by the software application and generated using the compiler.

In one embodiment, the software application and the compiler are tangibly embodied in the computer-readable medium. When the instructions are read and executed by the non-transitory computer readable medium, the non-transitory computer readable medium performs the steps necessary to implement and/or use the present invention. A software application, operating instructions, and/or firmware (semi-permanent software programmed into read-only memory) may also be tangibly embodied in the memory and/or data communication devices, thereby making the software application a product or article of manufacture according to the present invention.

The database is a structured set of data typically held in a computer. The database, as well as data and information contained therein, need not reside in a single physical or electronic location. For example, the database may reside, at least in part, on a local storage device, in an external hard drive, on a database server connected to a network, on a cloud-based storage system, in a distributed ledger (such as those commonly used with blockchain technology), or the like.

The power supply outputs a particular voltage to a device or component or components of a device. The power supply could be a direct current ("DC") power supply (e.g., a battery), an alternating current ("AC") power supply, a linear regulator, etc. The power supply can be configured with a microcontroller to receive power from other grid-independent power sources, such as a generator or solar panel.

With respect to batteries, a dry cell battery may be used. Additionally, the battery may be rechargeable, such as a lead-acid battery, a low self-discharge nickel metal hydride battery ("LSD-NiMH") battery, a nickel-cadmium battery ("NiCd"), a lithium-ion battery, or a lithium-ion polymer ("LiPo") battery. Careful attention should be taken when using a lithium-ion battery or a LiPo battery to avoid the risk of unexpected ignition from the heat generated by the battery. While such incidents are rare, they can be minimized via appropriate design, installation, procedures, and layers of safeguards such that the risk is acceptable.

The power supply could also be driven by a power generating system, such as a dynamo using a commutator or through electromagnetic induction. Electromagnetic induction eliminates the need for batteries or dynamo systems but requires a magnet to be placed on a moving component of the system.

The power supply may also include an emergency stop feature, also known as a "kill switch," to shut off the machinery in an emergency or any other safety mechanisms known to prevent injury to users of the machine. The emergency stop feature or other safety mechanisms may need user input or may use automatic sensors to detect and determine when to take a specific course of action for safety purposes.

In some embodiments, the network is, by way of example only, a wide area network ("WAN") such as a TCP/IP based network or a cellular network, a local area network ("LAN"), a neighborhood area network ("NAN"), a home area network ("HAN"), or a personal area network ("PAN") employing any of a variety of communication protocols, such as Wi-Fi, Bluetooth, ZigBee, near field communication ("NFC"), etc., although other types of networks are possible and are contemplated herein. The network typically allows communication between the communications module and the central location during moments of low-quality connections. Communications through the network can be protected using one or more encryption techniques, such as those techniques provided by the Advanced Encryption Standard (AES), which superseded the Data Encryption Standard (DES), the IEEE 802.1 standard for port-based network security, pre-shared key, Extensible Authentication Protocol ("EAP"), Wired Equivalent Privacy ("WEP"), Temporal Key Integrity Protocol ("TKIP"), Wi-Fi Protected Access ("WPA"), and the like.

In some embodiments, a device could include one or more communications ports such as Ethernet, serial advanced technology attachment ("SATA"), universal serial bus ("USB"), or integrated drive electronics ("IDE"), for transferring, receiving, or storing data.

Figure 4:
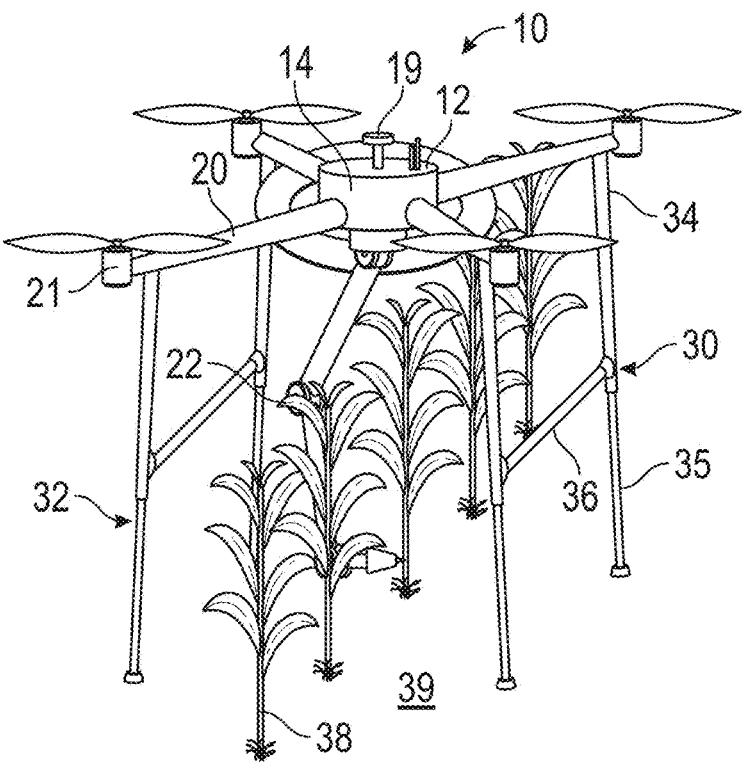
FIG. 4 is a view of the UAV of FIG. 3 with the probe contacting a plant.

Extending from the platform 12, such as downward from the platform 12, is a movable control arm 22. In FIGS. 3 and 4, the movable control arm 22 is an articulated robot arm 23 includes a number of segments connected by joints 24, at which the segments can move in relation to one another. The articulated robot arm 23 is preferably light-weight and has multiple degrees of freedom.

It should be appreciated that, while some embodiments include a single movable control arm 22, this should not be limiting on the disclosure and more than one control arm could be included with a UAV 10. For example, multiple control arms may be needed and/or used when samples (e.g., plant leaves) are needed to be held in place to allow the engagement of instruments (e.g., sensors or actuators). As should be understood, the one or more control arms could be the same arms or different arms, which are included herein. Any combination of one or more arms, including the use of any of the tools associated with the arms, should be considered a part of the disclosure, and covered herein.

At the end of the articulated robot arm 23 is an end effector 25 that is customized for employing different tools for physically contacting either or both of plants 38 and the ground 39, and which is able to acquire specimens or samples for analysis. The end effector 25 can employ insertable, clampable sensor probes, or for collecting plant tissue samples. As will be understood, different tools could be implemented.

For example, in FIGS. 3 and 4, the tool is an insertable sensor probe 26. The sensor probe 26 can be inserted into the ground 39 or into a plant 38 to acquire a sample for collection and analysis. Any number or type of insertable sensor could be used, including, but not limited to in planta nitrate sensors (see, e.g., Ibrahim, H., Yin, S., Moru, S., Zhu, Y., Castellano, M. J. and Dong, L., 2022. In planta nitrate sensor using a photosensitive epoxy bioresin. *ACS Applied Materials & Interfaces,* 14(22), pp. 25949-25961, which is incorporated by reference), sap flow sensors (see, e.g., https://edaphic.com.au/products/sap-flow-sensors/heat-pulse-velocity-sap-flow-sensors/), and/or miniature insertable plant sensors (see, e.g., U.S. Pat. No. 10,921,303, which is hereby incorporated by reference for disclosure of one or more sensors), however, any suitable sensor could be used.

Still additional features of the UAV 10 can include imagery sensors 29, such as stereo cameras, LiDAR, or other time of flight sensors that can provide object detection in 3D space. This can provide feedback for the analysis and also can be used to guide the end effector 25 to reach the target (i.e., plants and/or ground).

The platform 12 also includes a sensor cleaning, conditioning, and/or reconditioning solution container 37 that carries proprietary solutions for sensor or actuator cleaning, conditioning and/reconditioning between the samples.

The UAV 10 includes a landing system 30 that allows for level landing of the UAV 10, even at unlevel terrains. The landing system 30 includes legs 32. The legs 32 include first and second telescoping members 34, 35 that are movable in relation to one another. One or more support arms 36 provide support for the legs 32. The telescoping legs (four legs are shown, but three or more could be used), are movable to extend and retract so that the feet of the legs can contact the ground in a manner in which the platform can be stabilized and substantially horizontal to allow operation of the end effector. Thus, the landing system 30 is self-leveling. The self-leveling landing gear includes prismatic joints on its landing legs to ensure a leveled landing posture on uneven ground surfaces by using the signals from the onboard inertial measurement unit (IMU) sensor.

Therefore, the GPS and controls of the UAV 10 will control the flight to a selected location. The UAV 10 can be landed and leveled and the end effect can be inserted into a plant or the ground to acquire data therefrom, which can be used to create the prescription map.

Figure 5:
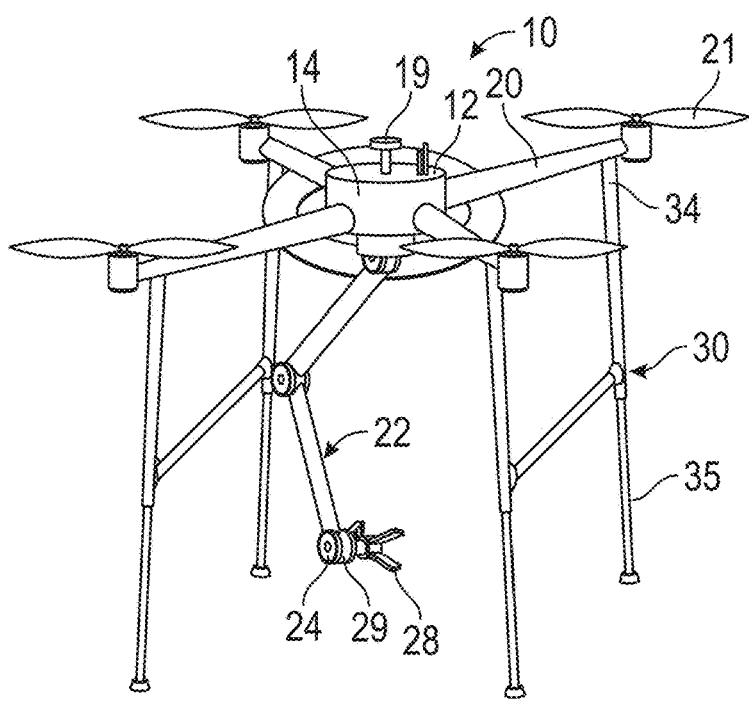
FIG. 5 is a view of the UAV of FIG. 3 with collection tool according to aspects of the present disclosure.
Figure 6:
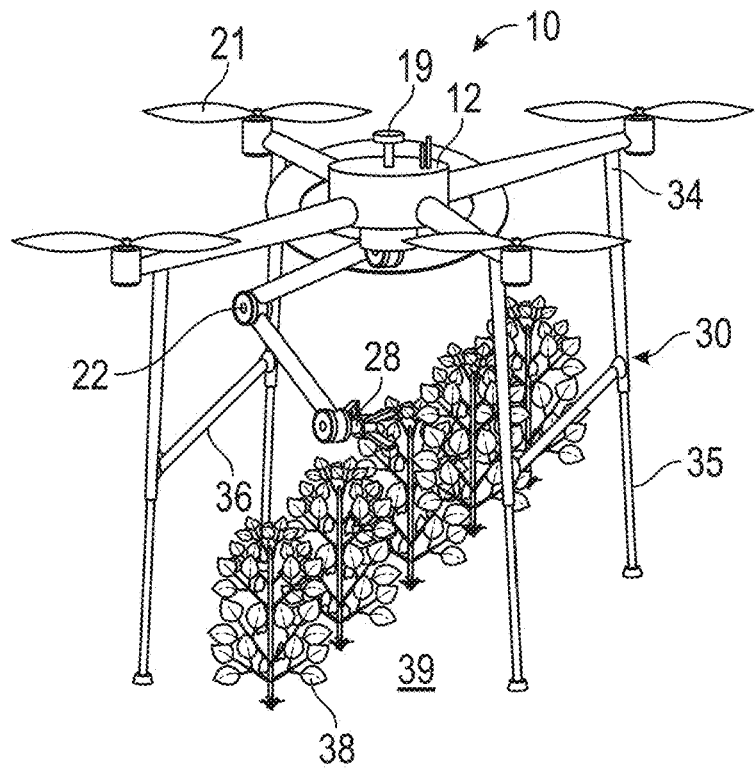
FIG. 6 is a view of the UAV of FIG. 5 with the collection tool contacting a plant.

FIGS. 5 and 6 show a similar UAV 10, but with a different end effector 25. The end effector in these figures is shown to be a clamping sensor probe 28, in which the clamping member clamps on portions of a plant 38 to acquire information therefrom. Any number or type of clampable sensor could be used, including, but not limited to a transpiration sap flow sensor (see, e.g., https://www.dynamax.com/products/transpiration-sap-flow/dynagage-sap-flow-sensor), LI-COR porometer/fluorometer (see, e.g., LI-600 and LI-600N Porometer/Fluorometer LI-COR Environmental (licor.com)), or portable spectrometers (see, e.g., https://www.oceanoptics.com/spectrometers/). The other portions of the UAV 10 in these figures can be the same. In addition, the information from the clamping sensor 28 can be used to create the prescription map.

Still other collection or sampling tools could be used, including, but not limited to, cutting tools, digging tools, or other members that can contact the plant or the ground to acquire information therefrom. The sensors may include vision sensors, radar sensors, LIDAR sensors, heat sensors, moisture content sensors, radio frequency sensors, short-range radio, long-range radio, antennas, and the like. These sensors can be grouped in any manner and can be used to determine many aspects. For example, the sensors can be used to determine the location of a nearby object or obstruction. The sensors may be used to determine soil characteristics, such as moisture content, compaction, temperature, and the like. The sensors can also be location sensors to determine if the UAV is on level ground, on a side hill, going up or down hill, etc. The location sensors can also determine areas in which the UAV is not to travel, based upon pre-determined and/or programmed data. The sensors can then indicate to actuators, rotors, or other mechanisms on the UAV to prevent the UAV from being in an undesirable situation. The sensors could also be used with location determining systems, such as GPS. The combination of the sensors and location determination systems would allow a UAV to travel to a location without running into obstructions, without running into other UAVs, without damaging planted or existing crops, as well as with obeying other rules, such as FAA regulations.

Figure 7:
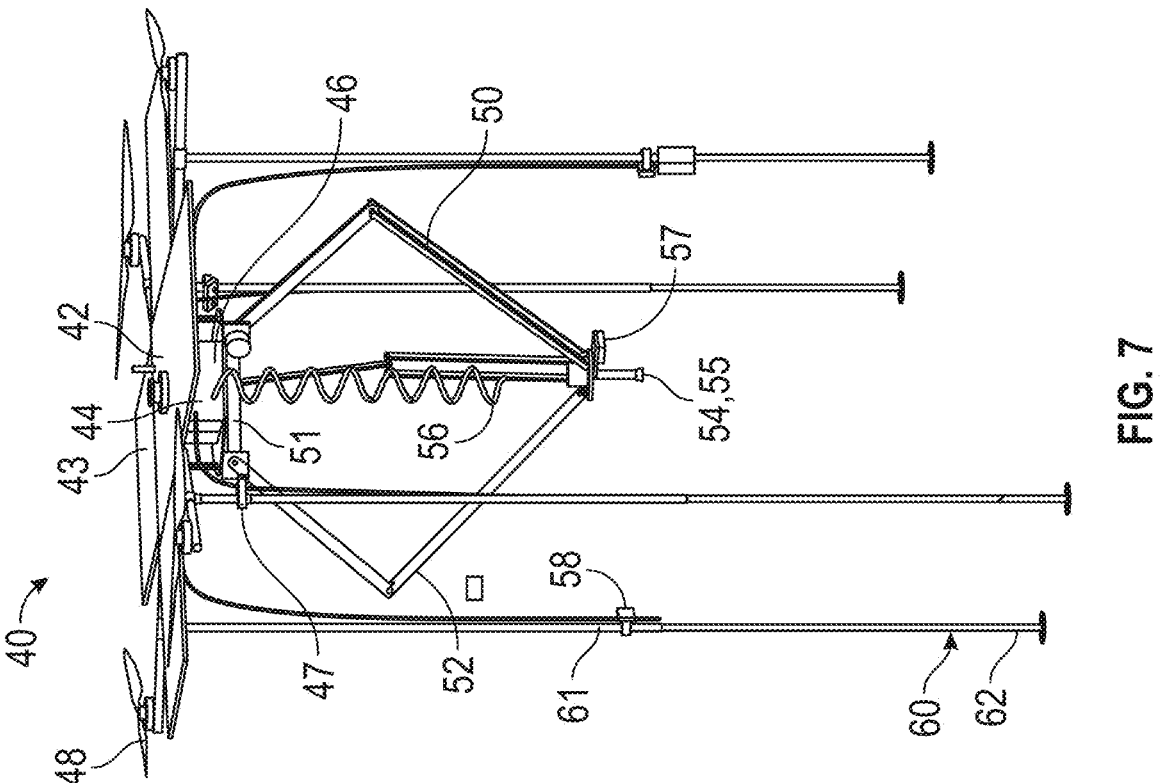
FIG. 7 is a view of another UAV according to aspects of the present disclosure.

FIG. 7 shows another UAV 40 according to the present disclosure. The UAV 40 of FIG. 7 includes the platform 42 with electronics (e.g., processor and camera) and rotor units 48 to propel the device. In addition, an extendable arm in the form of a delta robot 50 is shown as part of the collection apparatus. The customized delta robot 50 is attached underneath the UAV 40 along with cameras and range sensors for leaf tissue sampling. The delta robot 50 includes a base 51 and a plurality of robot arms 52. An end effector is positioned at the end of the robot 50. Because the actuators of a delta robot 50 are all located in the base 51, its arms can be made of a rather light composite material such as carbon fiber. This will not only reduce the torque requirement of the actuators (allowing the use of small motors) but also make it possible to develop a lightweight robot sampler that can meet the payload constraints of a multicopter.

Given the variations in sampling tasks (specimen retrieval, probing, imaging, etc.) and different crop species (e.g., tall-growing corn plants and low-canopy soybean plants), it is envisioned that several versions of robot samplers are needed. But they will all be designed as modules that can be easily attached to the UAV platform.

Figure 9:
FIG. 9 is a view of a tissue sampling end effector for use with an UAV according to at least some aspects of the present disclosure.
Figure 9:
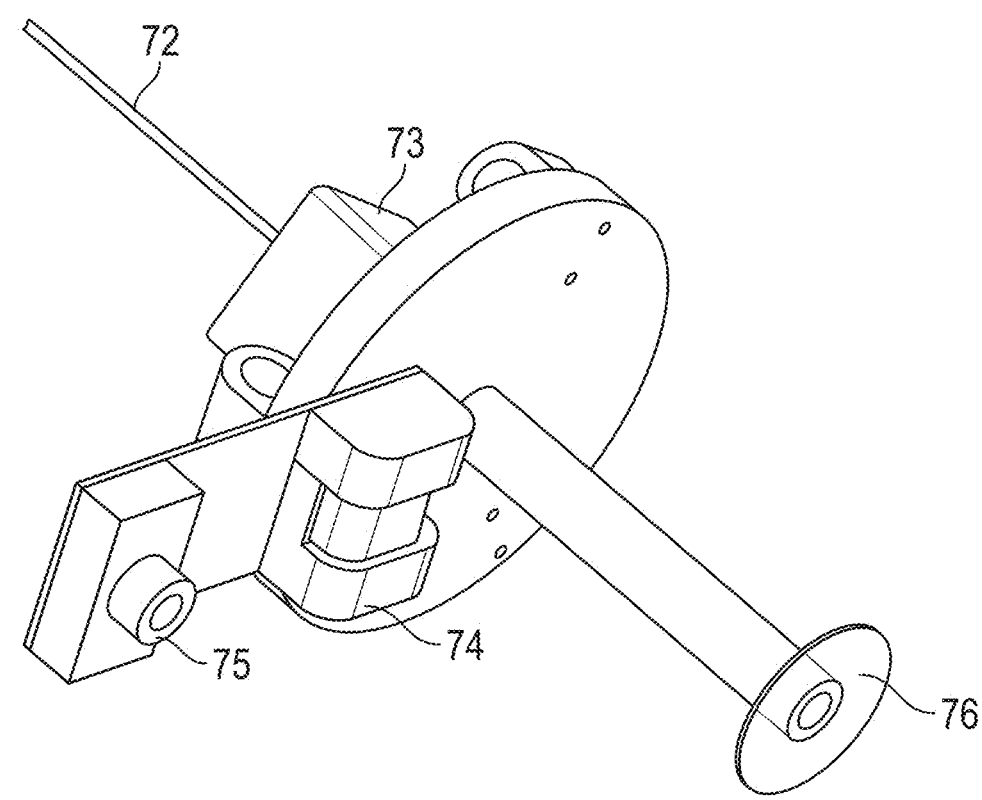

FIG. 9 shows an example of an end effectors 70 for use with such a UAV. FIG. 9 shows a tissue sampling effector 70 including a suction tube 72 and a motor 74. A LiDAR sensor 74 and camera 75 are used to position the electrostatic adhesive gripper, suction, and/or cutting assembly 76 at the plant to acquire the sample therefrom.

Figure 10:
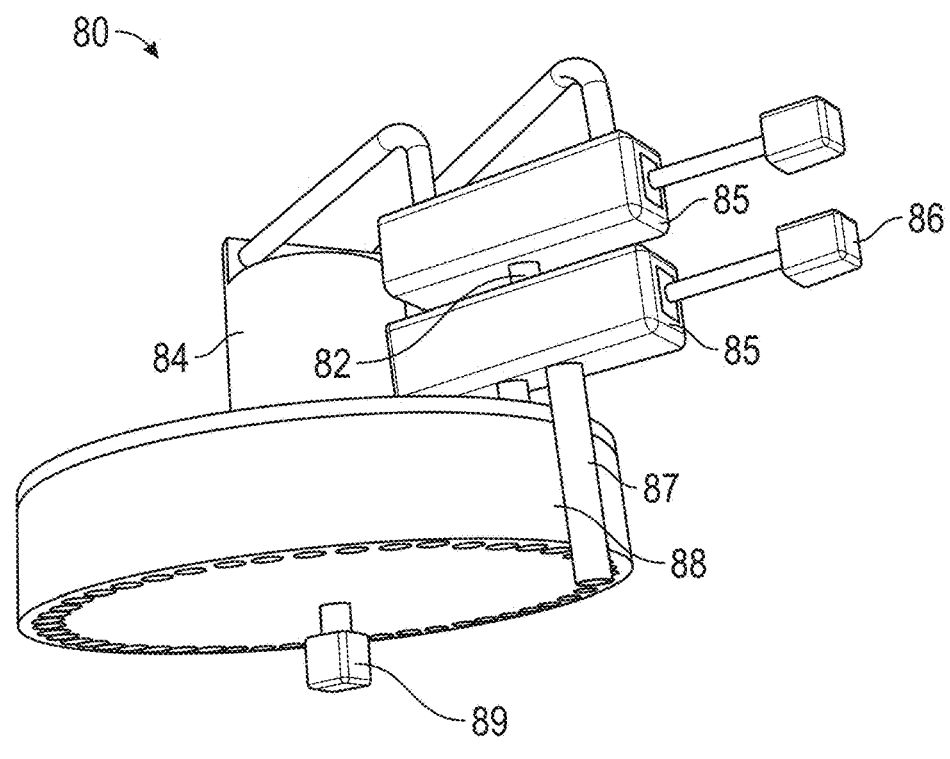
FIG. 10 is a view of a sample storage and sorting assembly for use with an UAV according to at least some aspects of the present disclosure.

FIG. 10 shows a sample storage and sorting assembly 80 that can be positioned on the UAV platform 42. The assembly 80 includes an in-tube strainer, a vacuum pump 84, one or more valves 85 (three and/or four way valves), and a solenoid 86. The suction tube 87 (which may be the same as the suction tube 72 of FIG. 9) is connected to a storage magazine 88 and turning motor 89 to select a cartridge to direct the collected sample for contemporaneous or later analysis.

Figure 8:
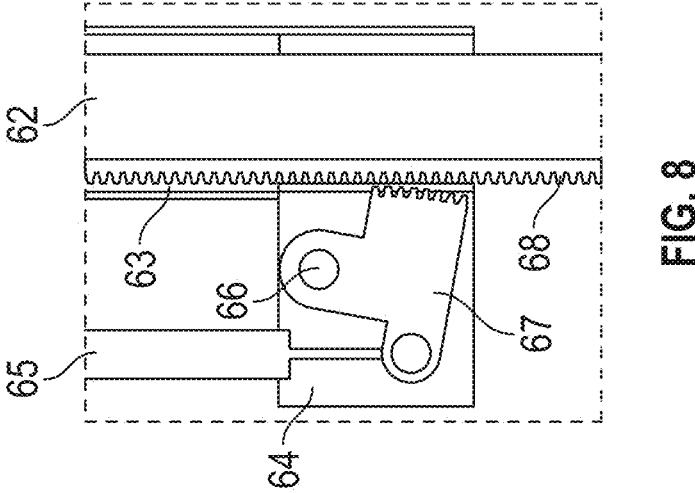
FIG. 8 is an enlarged view of a landing leg locking mechanism of FIG. 7.

FIG. 8 also shows a portion of the landing system 60 of the UAV 40. Landing on top of plants at an assigned location is required before engaging the robot sampler. One reason is that the airflow generated by the propellers will agitate the leaves, which interferes with the sampling operations. The other reason is that the energy consumption after landing is negligible compared to that consumed in hovering, which contributes to the extended duration. Considering the uneven landing surface, i.e., the slope of primary farmland in Midwest can typically reach 14% (~8-degrees), requiring an adaptable landing system to maintain horizontal status such that the robot sampler can remain stable during manipulations. Autonomous landing on uneven surface has been a challenging topic for UAVs. A conceptual lightweight landing system 60 is also presented in FIGS. 7 and 8, where the landing legs can extend and retract. Once the multicopter 40 reaches the close proximity of an assigned sampling point by using RTK-GPS signal, a vision system will be employed to identify the landing zone. The UAV 40 will then transit to the top of the landing zone and then descend with a leveled posture at a slow vertical speed. To achieve the functionality of autonomous landing on uneven surface using light weight and energy efficient mechanism, the present disclosure includes a novel passive self-adaptive landing gear design where each landing leg has two tubes 61, 62 that can telescope. A light duty compression spring 66 will be installed inside the outer tube to exert a down force to the inner tube. A toothed rack 68 will be fixed to the inner tube 63. On each leg, a torsion spring-loaded locking pin 67 will be disengaged to allow the inner tube to fully slide downward before landing. Pressure sensors will be installed at the foot of each leg to determine if all four legs reach the ground. In this way, as soon as the UAV 40 is hovering down to a desired distance to the plant canopy and four legs reach the ground, an actuation mechanism (e.g., central actuator 65, which may be a solenoid actuator) will release the locking pins 67 via the break wire 64 to immediately lock the landing legs in position (FIG. 7). Such landing system will only add about 500 grams of payload when using carbon fiber materials but allow for landing on a slope with inclination angle even higher than 15-degrees.

However, it should be noted that there could be additional ways for telescoping the legs of the landing system, and the preceding has been included for example purposes only.

Figure 11:
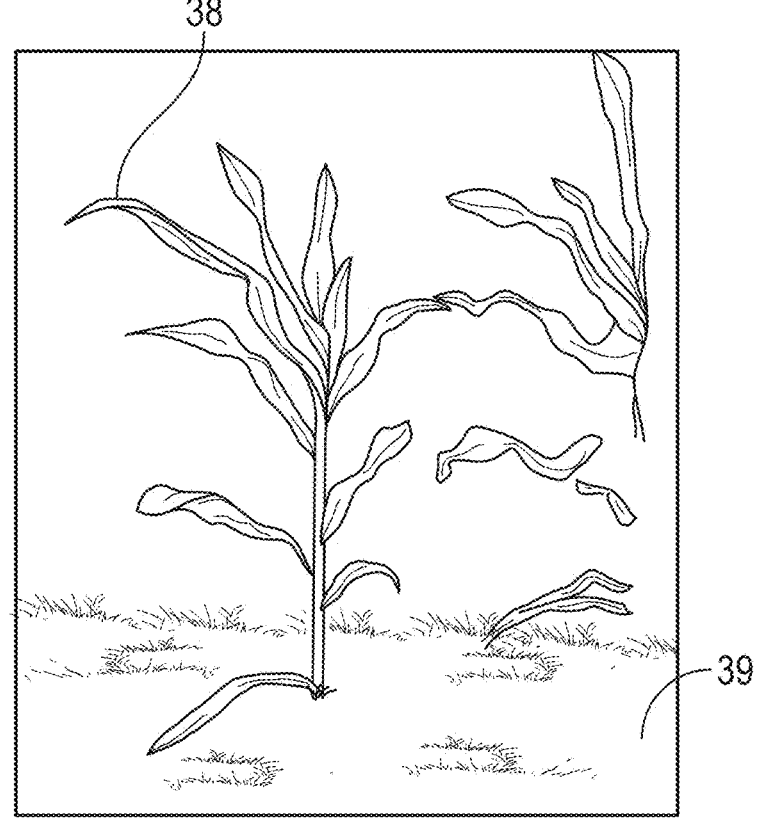
FIG. 11 is depiction of an image generated with a stereo camera on a UAV.

As noted, any of the UAVs provided can include cameras, sensors, or other imagery capturing devices. Stereo vision offers a reliable, cost-effective, and high-resolution 3D reconstruction technology for field-based plant sampling where recognizing and localizing a target in 3D space is required. The 3D reconstruction quality primarily depends on the dense stereo correspondence matching algorithm. It has been found that stereo matching algorithms can efficiently produce sub-pixel accuracy for highly slanted surfaces, typical of plant leaves and other structures (see, e.g., the plant 38 of FIG. 11). At least some aspects of the present disclosure includes a parallel implementation on a Graphics Processing Unit (GPU) to speed up the computational process and will investigate the 3D stereo reconstruction algorithm on an embedded platform such as NIVIDA Jetson series with a goal of achieving decent reconstruction quality while meeting the real-time constraints for fast decision-making.

As noted, the main mission of any of the UAVs shown, described, or otherwise covered by the present disclosure is to carry sampling instruments to assigned locations, land over the target plant(s), and then conduct various plant sampling tasks such as tissue specimen collection, probing with bio-sensors (e.g., a needle sensor for instantaneous nitrogen, phosphorus, and potassium sensing), imaging, and spectroscopic sensing for disease and pest stress diagnosis.

The UAVs provided herein provide for such an improvement, but also provide additional advantages, including, weight minimization (to maximize the flight endurance of the UAV, the robotic sampler needs to minimize its overall weight through the structural and mechanism design, and material selection); energy expense minimization (all energy consuming components such as motors and sensors need to be carefully selected to minimize the direct energy expense); and adequate sensing capability (the robot needs to be able to detect the desired leaf sample, know its own posture (position and attitude) relative to the target to accurately control the end effector for tasks like leaf tissue sampling, probing with bio-sensors, and to characterize plants from top and side views in spectral and spatial spaces).

FIG. 12 includes an electronics package 11 that can be used with any of the UAVs. This can include, but is not limited to, processors 14, memory 15, databases 17, computer readable medium, and/or communication modules 18. Additionally, power sources 16 (e.g., batteries and/or solar power), GPS antennas 19, and other components can be attached to this package 11 to provide additional support.

An alternative method to achieve long-term operation is to tether multiple UAVs to a UGV which has ample onboard battery power storage to form a UGAV system. For some power demanding plant sampling operation at a field scale, the rather limited battery power aboard of UAVs poses a major limitation. Therefore, a practically feasible solution is provided that is to form a UAV+UGV system where a fleet of UAVs is tethered to a UGV, which essentially serves as a power bank for the UAVs. Such a plan may resolve power shortage issue of the UAVs while achieving needed throughput for large scale operations. In the event where UGV is not available, these UAV-based robotic samplers can also be tethered with manned field equipment like tractors, sprayers, or other implements.

Figure 13:
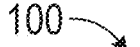
FIG. 13 is a view of another UAV in the form of a robotic multicopter sampler according to aspects of the disclosure and including the ability to sense a nutritional condition inside a stalk of a plant and the ability to sense soil health.
Figure 14:
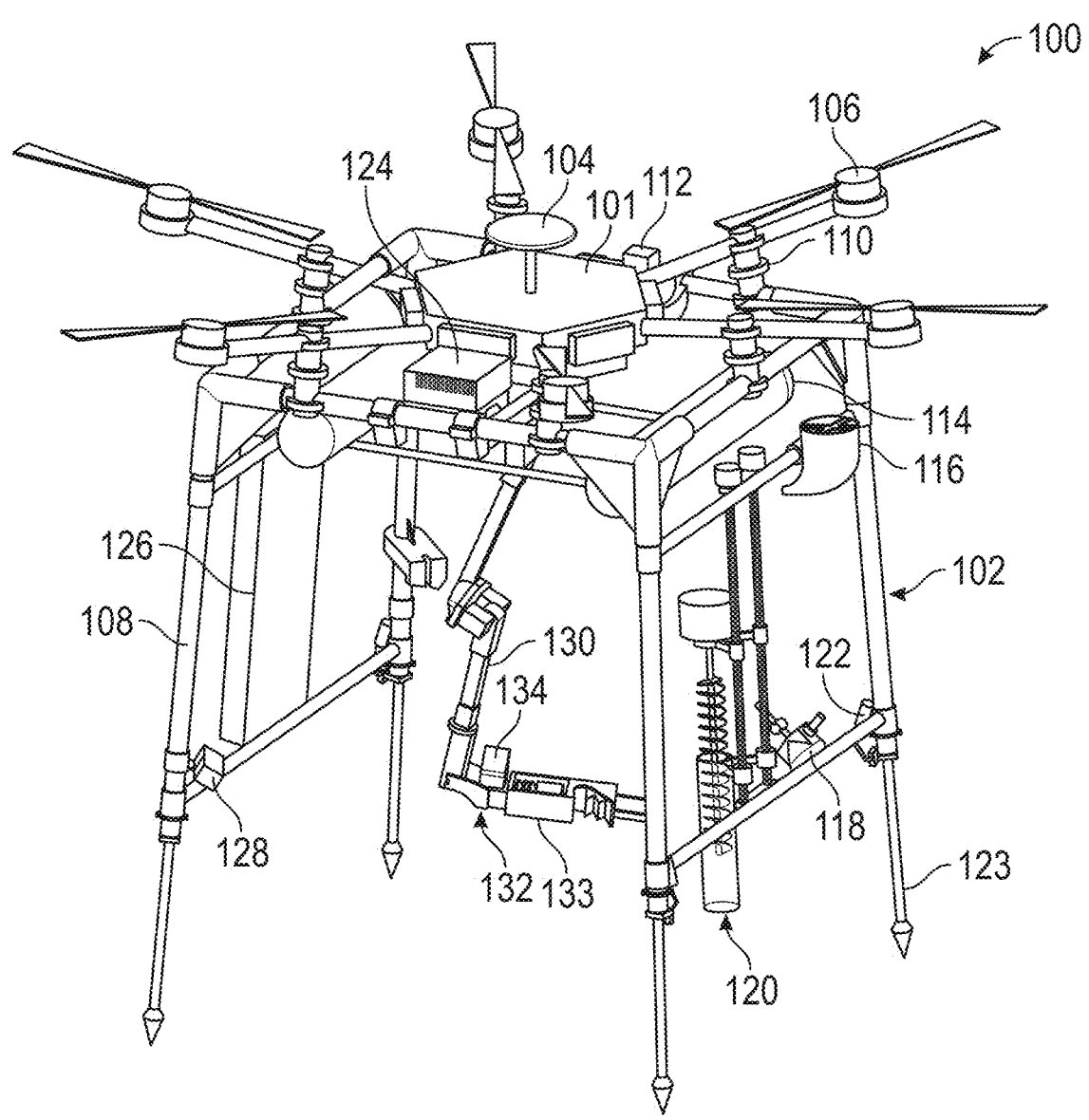
FIG. 14 is another view of the UAV of FIG. 13 showing additional components and details.

FIGS. 13 and 14 disclose an additional UAV 100 that includes yet additional elements for a robotic multicopter sampler that can perform in-field nutrient sensing inside a plant stalk using an engageable probe, as well as soil health sensing using a ground engaging soil collection mechanism. According to some embodiments, the plant stalk sensing element is an insertable probe into a portion of a crop, and the ground engaging element is an auger-based soil collection mechanism. However, it should be appreciated that the disclosure need not be limited to such elements, and other types of plant stalk sensors and/or soil collection mechanism be considered a part of the disclosure.

It should be noted that the UAV 100 shown in FIGS. 13 and 14 is similar to the UAVs 10, 40 previously shown and/or described. However, additional, and alternative elements will be understood to be included with respect to the UAV 100, which includes a drone 101 and associated robot platform 102 (also referred to as the robot). As will be understood, the UAV 100 of FIGS. 13 and 14 includes both an end effector 132 with soft robot assembly 133 and soil tray 142, as well as a soil collection assembly 120.

Figure 15:
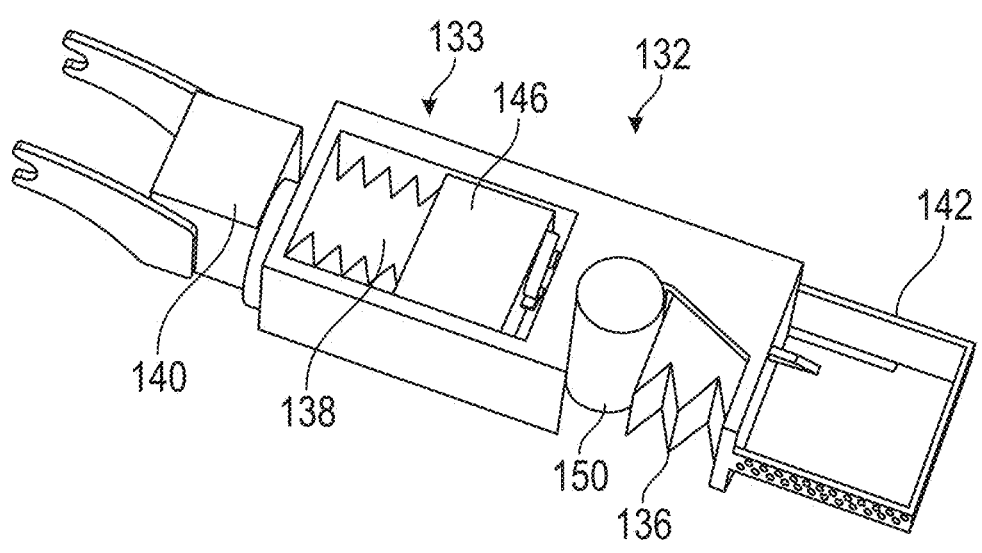
FIG. 15 is a view of a soft robot assembly for use with the UAV of FIG. 13 engaged with an example of a crop stalk.
Figure 16:
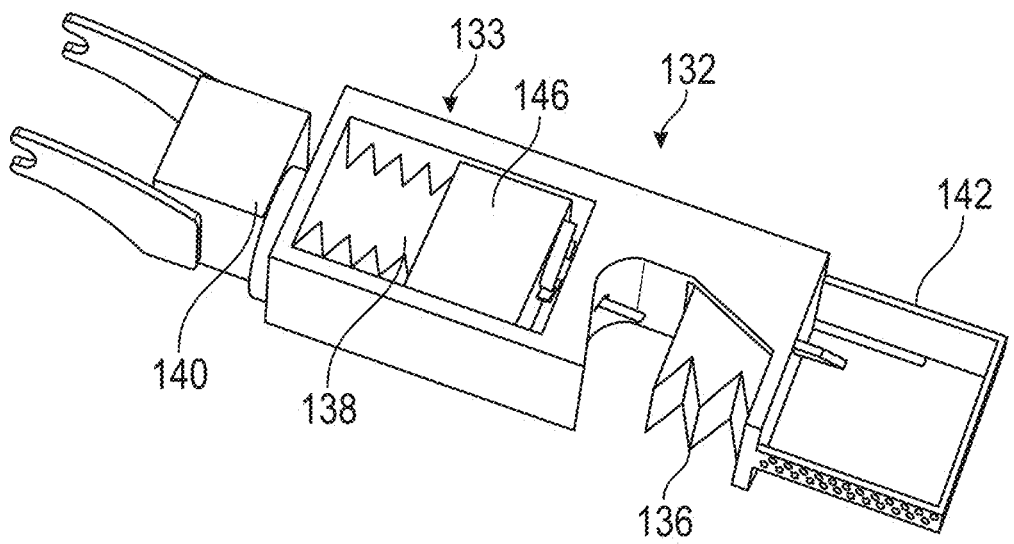
FIG. 16 is another view of the soft robot assembly with the stalk removed.
Figure 17:
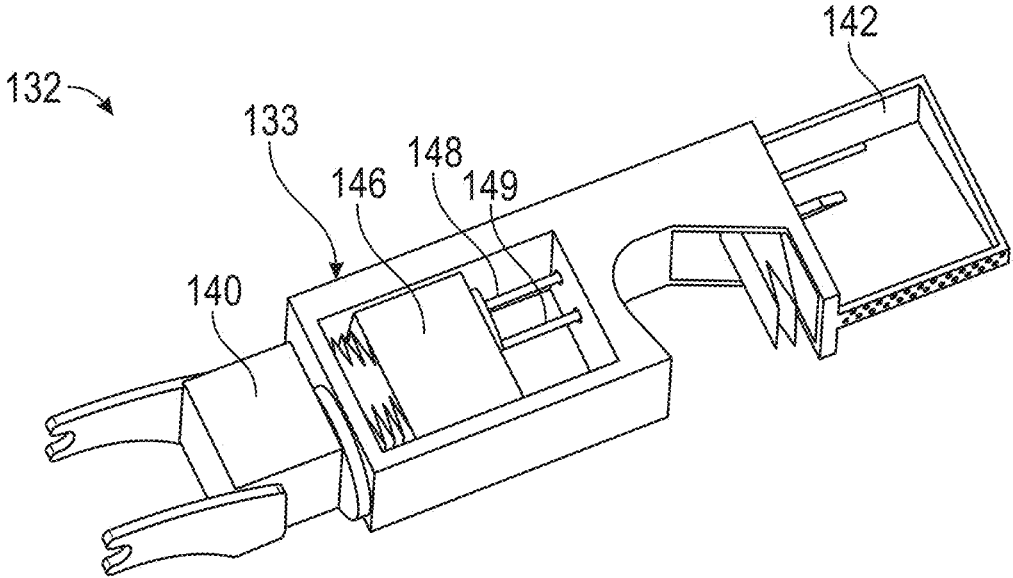
FIG. 17 is another view of the soft robot assembly in a ready to engage position.
Figure 18:
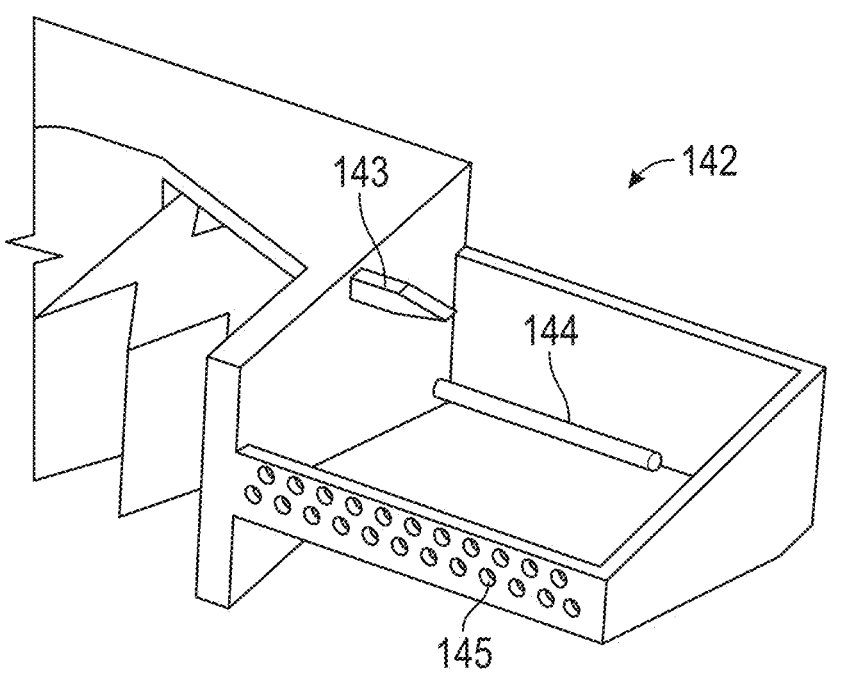
FIG. 18 is an enlarged view of the soil tray portion of the soft robot assembly of FIG. 15.
Figure 19:
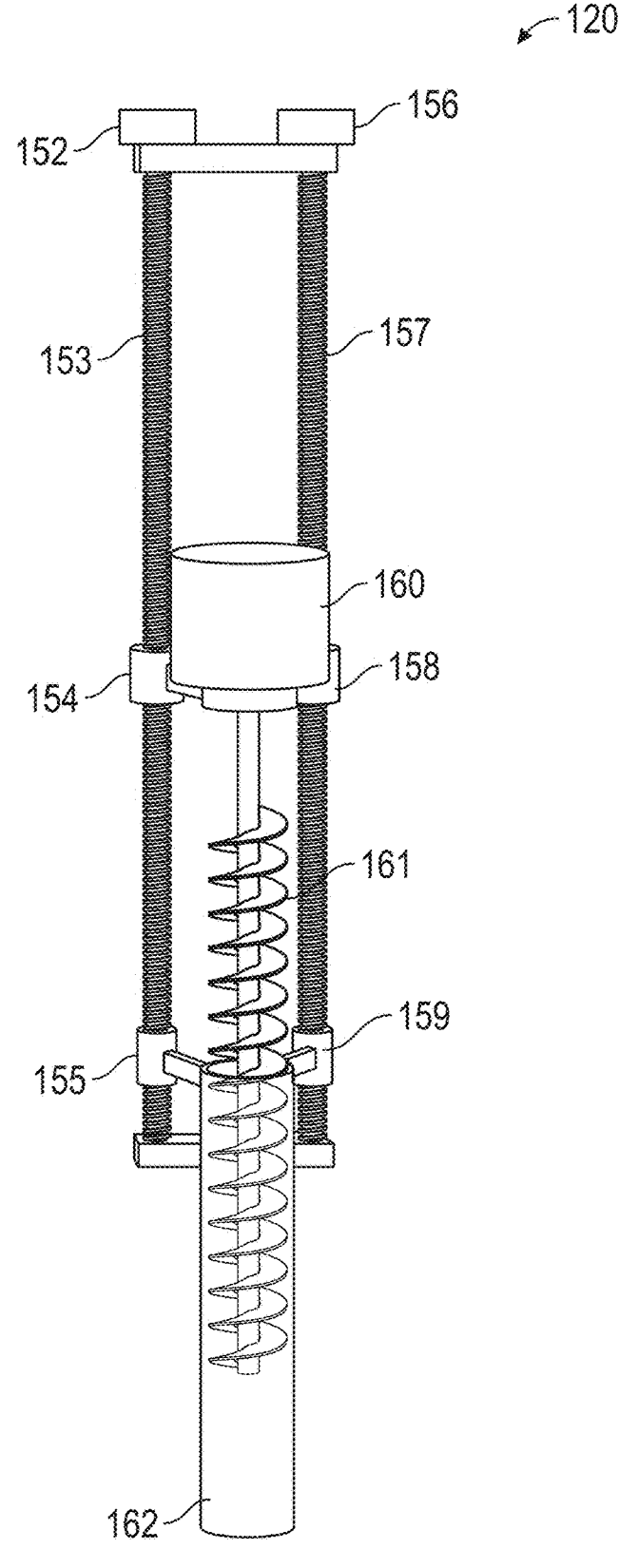
FIG. 19 is a view of a soil collection assembly for use with the UAV of FIG. 13 showing aspects thereof.

The robot 102 has an articulating arm 130 with an end effector 132 that includes a soft robotic stalk-clamping mechanism (i.e., a soft robot assembly 132) that includes, in some embodiments, a needle insertion system for measuring a plant's internal nutrient status (e.g., inside of a corn stalk 150, such as shown in FIG. 15). The end effector 132 also includes a soil tray 142 that can be embedded with a sensor probe (or probes), such as for measuring soil nutrient levels. The soil can be provided by a soil collection assembly 120 (see, e.g., FIG. 19) that can utilize a motorized auger and a tubular soil trough. Stepper motors drive lead screws that raise and lower the auger and trough, allowing soil samples to be collected from various depths.

FIG. 14 shows many additional components of the UAV 100 that enable both the plant and soil sensing tasks. It should be noted that not all of the components be required in all embodiments, and other components, such as those included in any of the other embodiments shown and/or described herein, may be included in addition to or in replace of the components shown in FIG. 14.

As shown in FIG. 14, the UAV 100 includes a drone 101 that includes a GPS antenna 104, which provides georeferencing for the collected data and assists with the drone's navigation. The GPS more generally is a satellite navigation or satnav system, which is a system that uses satellites to provide autonomous geopositioning. A satellite navigation system with global coverage is termed global navigation satellite system (GNSS). The drone sampler 101 uses an onboard GPS receiver (with the GPS antenna 104) and a flight controller (such as in the embedded computer 124) to navigate to the target location.

Surrounding a platform of the drone 101 are a number of rotor units, which are the same or similar to the rotor units previously disclosed. The figures show that the UAV 100 includes six rotor units, but it should be appreciated that any number greater than four rotor units should considered a part of the present disclosure.

As noted, extending generally downward from the drone 101 is a robotic platform 102 (also referred to as the robot) including a frame 108. The frame 108 is shown to be connected to the drone 101 via frame couplers 110 positioned on arms of the rotor units 106. The frame couplers 110 can be quick-connect couplers allowing easy attachment and detachment between the sampler's robot frame 108 and the drone 101. Generally, the number of couplers 110 match the number of rotor units 106, but this is not required. For example, a lesser number of couplers 110 than rotor units 106 would still allow coupling between the drone 101 and the frame 108.

Additional components of the UAV 100 is an air pump 112 positioned on the robot frame 108. The air pump 112 pressurizes air bags (for the soft robot assembly 133, as will be described herein) and a water tank 114. The water tank 114 may be a baffled water tank that supplies water for saturating soil samples and for cleaning sensor probes. Internal baffles reduce water sloshing to aid flight stability.

A blower 116 is positioned on the robot frame 118 and can be used to dry any of the sensor probes after they have been cleaned. Such cleaning can be aided by a water jet nozzle 118, which is fluidly connected to the water tank 114 and which produces a pressurized water jet for cleaning the sensor probes and for saturating soil samples.

A compact pneumatic system provides pressure for both the soft robotic actuators and the water-jet cleaning system. An air pump pressurizes the end effector's air bags and also pressurizes a water tank to drive a jet of water through the nozzle for cleaning the sensor probes. A baffled water tank is used to minimize water slosh during flight. After the probes are rinsed, a small blower is used to dry the sensor probes (FIG. 2).

Such soil samples can be acquired via the soil collection assembly 120, which is positioned on the frame 108. As will be understood with regard to FIG. 19, the soil collection system 120 integrates a motorized auger and a tubular trough (driven by lead screws) to collect soil samples from various depths.

The robot frame 108 also includes a landing system including a number of legs that can include an auto leveling landing system 164. The legs, shown to be four in the figures, can include a telescoping portion 123 that are spring-loaded landing legs that extend to adapt to uneven terrain and retract under the platform's weight. The legs may also include leg locks 122 that include a solenoid-controlled mechanism that locks the landing legs to keep the platform level once it has landed.

To aid in controlling and operating the UAV 100 (including both the drone 101 and/or the robot 102), an embedded computer 124 is provided. The computer 124 may include any of the programming, modules, processors, and other components as has been previously disclosed herein. The computer 124 is an onboard computer that handles image processing, flight navigation, and robot motion control. A battery 126 can be included. The battery 126 is used for the robot 102 and can comprise a battery pack that powers the sampling robot and also serves as a counterweight to balance the soil sampling assembly. The battery can take any of the forms provided herein.

One or more cameras, such as a landing guide stereo camera 128 comprises a longer-range downward-facing stereo camera used to guide the drone 101 for precise landing over a target plant.

An articulating robot arm 130 comprises a multi-jointed robotic arm that positions and maneuvers the end effector 132 for both plant and soil sensing operations. The arm 130 is connected to a portion of the frame 108 of the robot 102 at a first end, with the end effector 132 at the opposite end. Another camera, such as an eye-in-hand stereo camera 134 can be positioned at or near the end effector 132, which is a short-range stereo camera that detects and localizes the target (e.g., a corn stalk) to guide the sensor probe insertion.

Upon arriving above the target area, the drone 101 uses a downward-facing stereo camera (the landing guide camera 128) to capture images of the field and identify the crop row and target plant for landing. In addition, the short-range stereo camera 134 mounted on the robot arm's end effector (the eye-in-hand camera) is used to precisely locate the plant stalk and guide the probe insertion.

As noted, a soft robot assembly 133 is positioned at the end effector 132 and includes a sensor probe insertion and soil tray assembly. The assembly 133 uses inflatable "air bag" actuators to insert a needle-type sensor probe into a plant stalk. The assembly 133 also includes a soil tray with an embedded sensor probe for soil measurement.

The UAV 100 also includes a soil sample compression block, which is a fixed block against which the soil tray is pressed to squeeze out excess water from the sample and ensure good contact between the soil and the sensor.

Moving now to FIGS. 15-18, the end effector 132, soft robot 133, and soil tray 142 are provided. This lightweight end effector 132 uses two inflatable air bags (clamping air bag 136 and needle engaging air bag 138) to clamp onto a plant stalk 150 and insert a needle-type sensor probe into the stalk 150 for internal nutrient measurement. The clamping air bag 136 is an air bag that remains deflated when positioning around a stalk and inflates to firmly clamp onto the stalk. The needle engaging air bag 138 is an air bag that deflates to retract a needle from the stalk and inflates to push a needle into the stalk. This drives either the pilot hole needle or the sensor probe needle.

Both air bags are initially deflated (see, e.g., FIG. 17) to open the mechanism around the stalk while the robot arm positions it, such as with the end effector rotation motor 140, which rotates the entire end effector assembly 132. Once the stalk 150 is within the opening, one air bag (the stalk clamping air bag 136) inflates to firmly clamp the stalk (see, e.g., FIG. 15). The second air bag (the needle engaging air bag 138) then inflates to drive a sharp pilot needle 148 into the stalk, creating a small entry hole, and then deflates to retract that needle 148. A motorized tool changer 146 rotates the sensor probe needle 149 into alignment with the pilot hole, and the needle engaging air bag 138 inflates again to push the sensor probe needle 149 into the stalk 150 for measurement. The motorized tool changer motor 146 is a motor that can rotate 180° to switch between the pilot hole needle 148 and the sensor probe needle 149. This air bag-based insertion method keeps the end effector lightweight, making it compatible with the payload limits of both the robot arm and the drone.

To properly diagnose soil health conditions by using nutrient microsensors, soil samples need to be acquired from certain depths of the soil and be saturated with water but not oversaturated. It is preferred that the soil sensing mechanism be lightweight given the payload limitations of the drone platform. In the soil collection auger assembly 120 (see, e.g., FIG. 19), an auger 161 is employed to drill into the soil to a specific depth by using a motorized auger up/down lead screw mechanism 153. The auger lead screw 153 is a vertical lead screw mechanism that lifts or lowers the auger 161.

Before drilling starts, a tubular trough 162 will first be lowered to the soil surface by a motorized tubular trough up/down lead screw mechanism 157, which is a vertical lead screw mechanism that raises or lowers the tubular trough. While drilling, loosened soil will be carried upwards into the tubular trough 162 and exit from its top opening. Once the target depth is reached, the auger 161 stops rotating, and soil at that depth is retained within the auger flights. The auger 161 is then retracted, lifting the trapped soil sample into the tubular trough 162. The required soil sample is estimated to be less than 1 cubic inch in volume. Next, the tubular trough and the auger rise together at the same speed to their home position. The robot arm then positions a soil tray 142 (see, e.g., FIG. 18) beneath the trough 162 to receive the soil, and the auger 161 rotates against a scraper 143 while being pushed downwards to deposit the soil into the tray 142. The rotational speed and downward travel speed of the auger 161 are synchronized in such a way that no vertical force will be exerted from the rotating auger flight to the scraper 143 to mitigate damage to the scraper. The robot arm 130 will then move the soil tray 142 to the water jet nozzle 118, and water is added to gently saturate the soil sample. Finally, the soil tray 142 is pressed against the compression block to drain excess water (through the strainer perforations 145 in the tray) and ensure the soil makes good contact with the tray's embedded sensor probe 144.

Another manner in which the soil can be tested after the sample has been acquired, such as via the soil collection system 120, involves wetting the soil to field capacity by using capillary water. Capillary water is filled into soil pores via capillary action that can pull water upwards against gravity. One way of producing a soil sample at field capacity is to lay a layer of soil on top of a water-permeable membrane which is soaked with water, then the capillary force will suck the water into the soil pores if given some time. The time required is expected to be short given the amount of soil sample is small. For example, the soil tray 142 can be modified to incorporate a water-permeable membrane, or there can be a separate setup to take soil from the soil tray and then form the field capacity soil there. In any manner, it should be appreciated that this additional way of testing the soil sample can be completed via the UAV 100 and utilizing the components shown and/or described.

The soil scraper 143 is a scraper that removes soil from the auger into the soil tray when the auger is rotating while extending from the tubular trough. (For a right-hand flight auger, the auger rotates clockwise while being pushed out from the tubular trough, so soil is scraped off into the tray.) The soil sensor probe 144 is a customized sensor probe for measuring soil nutrient levels (e.g., nitrogen, phosphorus, potassium) in the collected soil sample. Finally, as noted, the tray 142 can include a strainer 145 in the form of perforations, which allows excess water to drain out of the soil sample when the tray is tilted and pressed against the soil compression block.

Additional components of the soil collection assembly 120 include an auger stepper motor 152, which drives the auger up and down via the lead screw 153. The auger 162 is a helical drill that bores into the soil and carries soil upward in its flights. A nut 154 on auger's lead screw 153 travels along the screw to move up and down. A linear bearing 155 guides and supports the auger as it moves up and down.

A tubular trough stepper motor 156 drives the tubular trough 162 up and down via the lead screw 157. The tubular trough 162 is a hollow tube that surrounds the auger and retains the soil as the auger drills into the ground or retracts into it after drilling. A nut 159 travels on the tubular trough's lead screw 157 to raise and lower the trough 162. A linear bearing 158 guides the tubular trough 162 as it moves up and down along the lead screw 157.

A compact pneumatic system provides pressure for both the soft robotic actuators and the water-jet cleaning system. An air pump 112 pressurizes the end effector's air bags and also pressurizes the water tank 114 to drive a jet of water through the nozzle 118 for cleaning the sensor probes. A baffled water tank is used to minimize water slosh during flight. After the probes are rinsed, a small blower 116 is used to dry the sensor probes.

Figure 22:
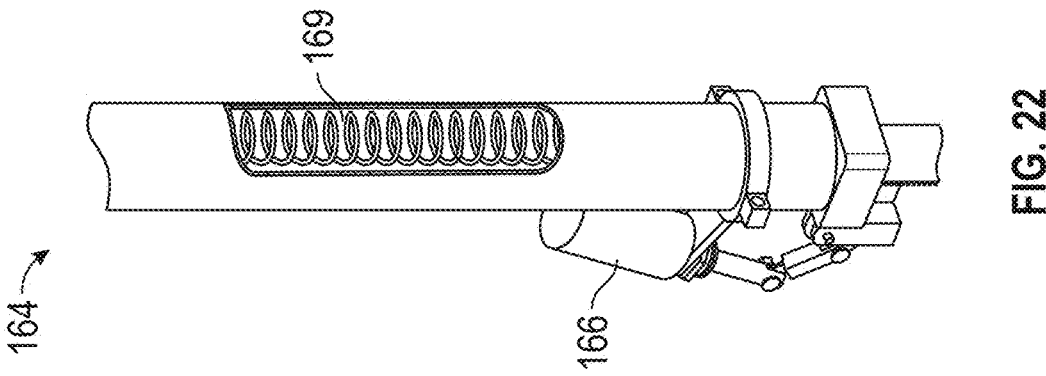
FIG. 22 is a partial sectional view of the auto leveling system showing a portion of a compression spring inside the leg of the UAV.
Figure 21:
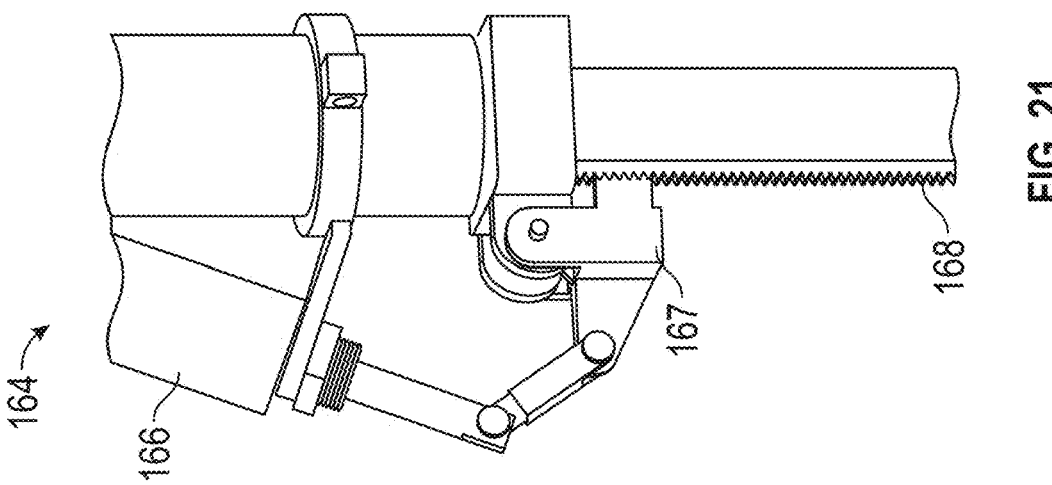
FIG. 21 is a view of the auto leveling landing system in a locked configuration.
Figure 20:
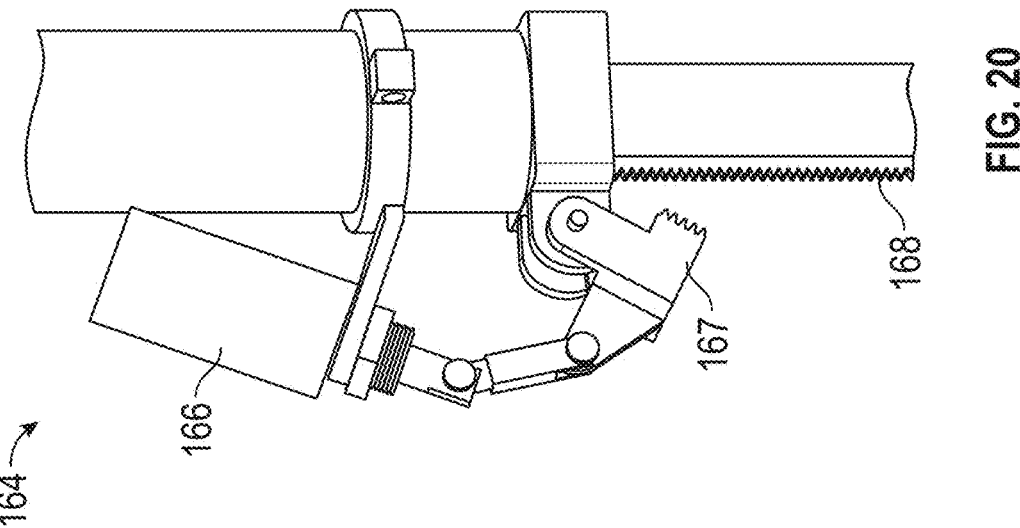
FIG. 20 is an enlarged view of an auto leveling landing system for use with the UAV of FIG. 13 in an unlocked configuration.

Moving now to FIGS. 20-22, an auto-leveling landing system 164 is shown. A self-leveling landing gear ensures the platform 108 can land evenly on uneven ground. Each of the four landing legs is telescopic and spring-loaded to extend as it touches the ground. During descent, the leg locks 122 remain disengaged, allowing the legs to adjust their length freely. Once all legs have contacted the ground and the platform is level, the solenoids 166 engage locking mechanisms on each leg, fixing the legs in place to provide a stable, level platform for sampling.

Components of the auto-leveling landing system 164 include a solenoid 166, which is an electromagnetic actuator that locks the telescoping leg in place when deenergized and allows the leg to move when energized (activated). A locking rack 167 is a pivoting toothed piece that engages with the leg's own toothed rack 168 to lock the leg in place when the solenoid is deactivated. The telescoping leg 123 with the toothed rack 168 is a landing leg that extends and retracts, with a toothed rack along its length for the locking mechanism to engage. A torsion spring is installed around the pivot to initiate the engagement and the weight of the platform will enforce the engagement. Finally, as shown in FIG. 22, a compression spring 169 is positioned inside the leg and pushes the leg to extend when the locking mechanism is disengaged.

Therefore, the UAV 100 has been shown and/or described in a way that would indicate that the UAV provides additional improvements and/or advantages for performing in-field nutrient sensing inside a plant stalk and also providing soil health sensing. The plant and soil collections will provide information that can be used to ensure best conditions for achieving the best possible yield.

Therefore, various aspects and/or embodiments have been provided for robotic plant samplers that can be attached to a multicopter UAV for field scale plant sampling and mapping. The targeted plant sampling missions will include leaf tissue specimen collection, direct bio-sensor probing for nutritional status inspection, and imaging and spectral sensing for disease and pest detection.

It should be appreciated that variations and/or changes to any of the components or embodiments that are obvious to those skilled in the art are to be considered a part of the present disclosure. In addition, any of the aspects of any of the embodiments disclosed could be combined in ways not explicitly shown and/or described to provide yet additional embodiments that are part of the disclosure. The disclosure is not to be limited to the embodiments disclosed herein.

The invention claimed is:

1. An unmanned aerial vehicle, comprising:
 a platform comprising a processor;
 a plurality of rotor units operatively connected to the platform;
 a movable control arm extending from the platform, the movable control arm comprising at least a physical specimen contacting tool, wherein the physical specimen contacting tool comprises a first inflatable air bag to contact a specimen and a second inflatable air bag comprising a sensor probe to contact the specimen with the probe;
 a ground penetrating and sample collecting system; and
 a self-leveling landing system.

2. The unmanned aerial vehicle of claim 1, wherein the movable control arm further comprises a non-physical sensor, and wherein the at least one physical specimen contacting tool comprises a sensor probe for plant chemical composition sensing.

3. The unmanned aerial vehicle of claim 1, wherein the at least one physical specimen contacting tool further comprises an end effector for collecting a portion of a plant.

4. The unmanned aerial vehicle of claim 1, wherein the at least one physical specimen contacting tool comprises a ground penetrating probe for sensing or collecting a portion of ground.

5. The unmanned aerial vehicle of claim 1, further comprising a non-physical sensor comprising one or more stereo cameras, one or more time-of-flight sensors, one or more 3D imagery sensors, or some combination thereof.

6. The unmanned aerial vehicle of claim 1, wherein the movable control arm comprises one or more articulated robot arms.

7. The unmanned aerial vehicle of claim 1, wherein the movable control arm comprises an end effector with the physical specimen contacting tool and a tray for receiving a sample collected by the ground penetrating and sample collecting system, the tray comprising a sensor.

8. The unmanned aerial vehicle of claim 1, wherein the self-leveling landing system comprises a plurality of telescoping legs to balance landing on uneven ground.

9. The unmanned aerial vehicle of claim 1, further comprising a GPS antenna.

10. The unmanned aerial vehicle of claim 1, further comprising a sensor cleaning solution container operatively connected to the platform to provide cleaning solution.

11. The unmanned aerial vehicle of claim 1, wherein the physical specimen contacting tool further comprises a pilot hole needle connected to the second inflatable air bag to create a hole in the specimen for the sensor probe.

12. A method for collecting both physical specimens and imagery information from plants and/or ground using a multicopter unmanned aerial vehicle of claim 1, the method comprising:

landing the multicopter unmanned aerial vehicle at or near the plants and ground using a landing system;

physically contacting the ground or plants with an acquisition tool connected to the multicopter unmanned aerial vehicle via a movable control arm to collect a physical sample;

collecting imagery information of the plants or ground with a sensor of the movable control arm; and georeferencing the physical sample and the imagery information with GPS.

13. The method of claim 12, further comprising cleaning, conditioning, and/or reconditioning the sensor after collecting the imagery information.

14. The method of claim 12, further comprising generating a prescription map for the application of particulate material based upon the collected physical and imagery information.

15. The method of claim 12, wherein the step of physically contacting the ground or plants with an acquisition tool comprises touching, penetrating, or removing a portion of the ground or plants.

16. The method of claim 12, wherein the step of landing the multicopter unmanned aerial vehicle comprises extending telescoping legs to self-level the multicopter unmanned aerial vehicle based on the elevation of the ground.

17. A system for collecting both physical specimens and imagery information from plants and/or ground to generate a prescription agricultural map, comprising:

an unmanned aerial vehicle, comprising:

a platform comprising a processor;

a plurality of rotor units operatively connected to the platform;

one or more movable control arms extending from the platform, the one or more movable control arms comprising at least a physical specimen acquisition tool and a non-physical sensor, wherein the physical specimen contacting tool comprises a first inflatable air bag to contact a specimen and a second inflatable air bag comprising a sensor probe to contact the specimen with the probe; and a self-leveling landing system; and computer readable medium including software to:

analyze data acquired from the at least a physical specimen acquisition tool and a non-physical sensor; and generate a prescription map for the application of particulate material based upon the analyzed data.

18. The system of claim 17, wherein the at least one physical specimen acquisition tool comprises a ground penetrating probe for sensing or collecting a portion of ground.

19. The system of claim 17, further comprising a GPS antenna to georeferenced the data acquired from the at least a physical specimen acquisition tool and a non-physical sensor.

20. The system of claim 17, wherein the self-leveling landing system comprises a plurality of telescoping legs to balance landing on uneven ground.

* * * * *